United States Patent [19]

Woody

[11] 3,901,096
[45] Aug. 26, 1975

[54] AUTOMOBILE OVERDRIVE
[76] Inventor: Willis F. Woody, P.O. Box 513, Lithia Springs, Ga. 30057
[22] Filed: May 6, 1974
[21] Appl. No.: 467,126

[52] U.S. Cl. .............................. 74/413; 180/70 R
[51] Int. Cl.² .................... F16H 1/06; B60K 17/00
[58] Field of Search ............. 74/730, 413; 180/70 R

[56] References Cited
UNITED STATES PATENTS

| | | | |
|---|---|---|---|
| 2,294,216 | 8/1942 | Stallman | 74/332 |
| 2,540,973 | 2/1951 | Wallace | 74/413 |
| 2,605,645 | 8/1952 | Tharpe et al. | 74/413 |
| 2,851,896 | 9/1958 | Ordway | 74/413 |
| 2,878,690 | 3/1959 | Capron et al. | 180/70 R |
| 3,331,464 | 7/1967 | Van Doorne | 180/70 R |

*Primary Examiner*—Leonard H. Gerin
*Attorney, Agent, or Firm*—Shoemaker and Mattare

[57] ABSTRACT

An automobile overdrive comprises a casing fixed to the automobile between the transmission and rear axle of the automobile, and an internal gear is rotatably supported in the casing and a spur gear is rotatably supported in the casing in mesh with the internal gear, shafts are connected with the internal gear and spur gear and extend from opposite ends of the casing in offset parallel relationship to one another and the outer ends of the shafts are connected with the transmission and rear axle, respectively, through universal joints, so that when the transmission of the automobile is put in gear, the overdrive effects a higher gear ratio than that obtained with the transmission, whereby increased economy is obtained and there is less wear on the engine and less air pollution caused by the engine. A modified overdrive is connected between the engine and transmission and includes a fluid drive connected with the internal gear and the fluid drive is connected to the crank shaft of the engine to be driven thereby and the spur gear is connected to the transmission, the fluid drive enabling the overdrive to be used at all times with automatic as well as manual transmissions.

6 Claims, 7 Drawing Figures

AUTOMOBILE OVERDRIVE

BACKGROUND OF THE INVENTION

This invention relates to an automobile overdrive which is positioned between the engine and rear wheels of the automobile to obtain a higher gear ratio than that obtained with the transmission of the automobile.

Various types of automobile overdrives have been known for many years for use with automobiles to obtain higher gear ratios, but such prior art overdrives are usually complicated and expensive, and are not durable or reliable in operation. Moreover, most prior art overdrives have means enabling the overdrives to be either shifted in or out of gear, and in order to utilize the overdrive, various operations of the throttle and clutch of the automobile must be performed in order to operatively connect the overdrive. For example, many well known types of prior art overdrives require that the vehicle attain a certain speed, after which the clutch is manipulated and/or the throttle is manipulated in order to shift the overdrive into gear.

With the present invention, the overdrive is an exceptionally simple and economical device, which is fixedly positioned to the automobile between the engine and rear axle, and which is effectively coupled with the engine and rear axle at all times, whereby the effect of the overdrive is obtained in all gears and at all speeds.

There are two forms of overdrive in accordance with the present invention, and one form of overdrive comprises a casing rigidly fixed to the frame of the automobile, and has an internal gear therein connected through universal joints with the transmission, and a spur gear meshed with the internal gear and connected through a universal joint with the rear axle in order to obtain a higher gear ratio than that obtained with the transmission. The other form of the invention includes a casing which is mounted between the engine and transmission, and which has a fluid drive connected between the crank shaft of the engine and the internal gear of the overdrive. The spur gear of the overdrive is in turn connected with the transmission, and the fluid coupling enables the overdrive to be readily used with automatic transmissions without requiring the overdrive to be engaged or disengaged through some operation or manipulation performed by the operator of the automobile.

OBJECTS OF THE INVENTION

It is an object of this invention to provide an automobile overdrive which is exceptionally simple and economical in construction, and which is mounted between the transmission and rear axle of the automobile, and which comprises a casing having an internal gear rotatably supported therein and a spur gear meshed with the internal gear, and said gears connected with the transmission and rear axle, respectively, and always in mesh to thus obtain an overdrive or higher gear ratio at all times.

Another object of this invention is to provide an automobile overdrive which is mounted between the engine and transmission of the automobile and which includes a fluid coupling connected with the overdrive gear means, whereby the overdrive may be used with an automatic transmission and in which the overdrive gears may always remain meshed with one another to thereby obtain an overdrive at all times.

DETAILED DESCRIPTION OF THE INVENTION

Figure 1:
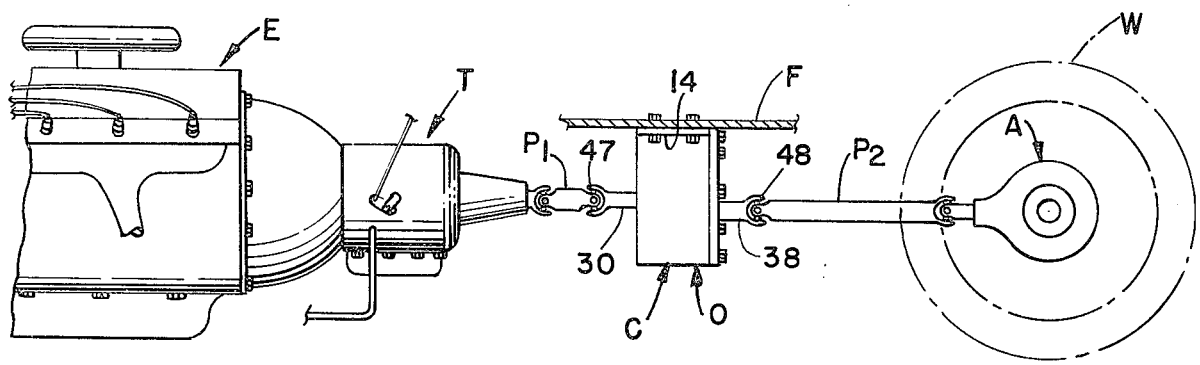
FIG. 1 is a diagrammatic view illustrating an engine, transmission, propeller shaft, overdrive and rear axle and rear wheel arranged according to one form of the invention.
Figure 2:
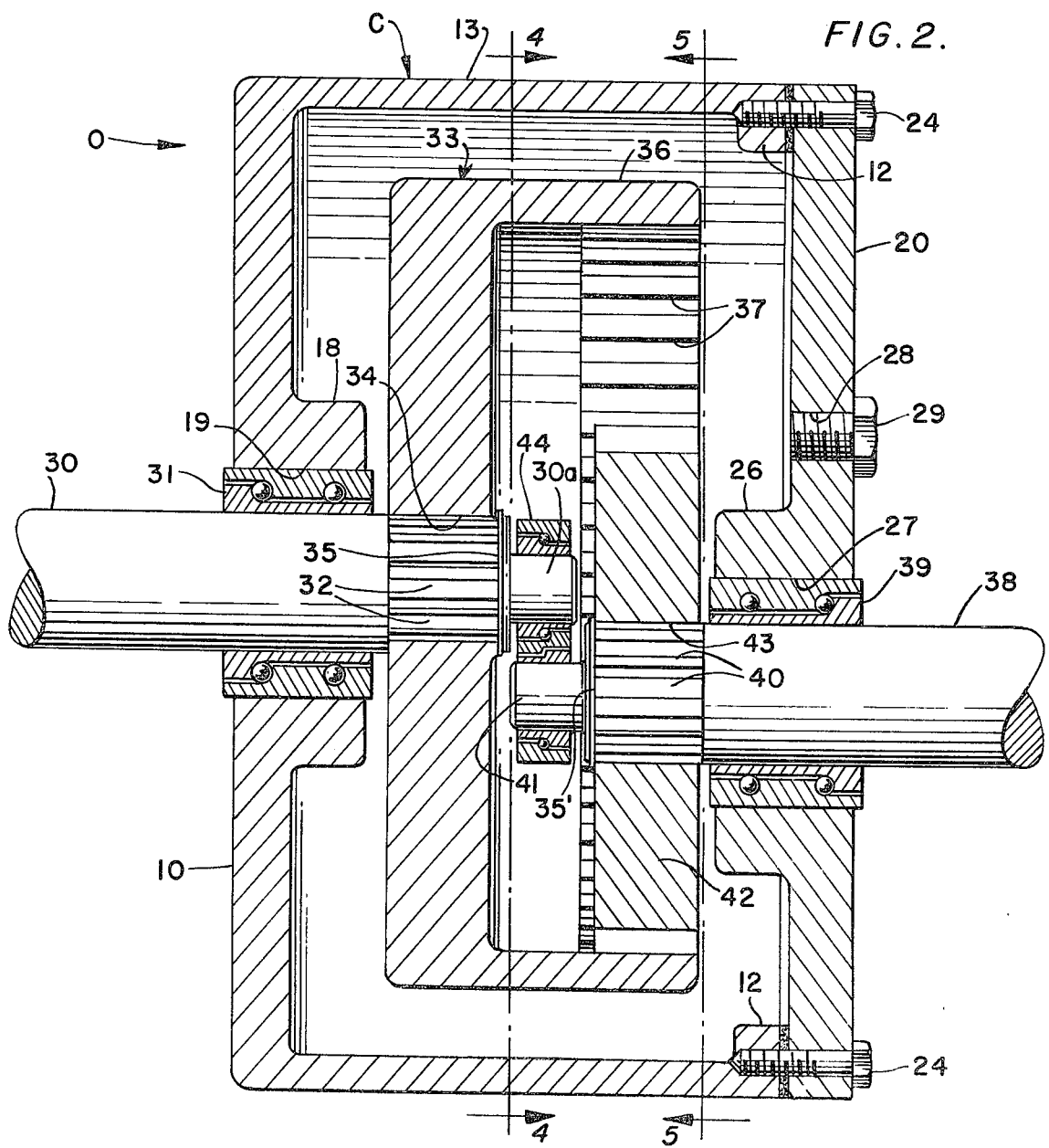
FIG. 2 is a greatly enlarged view in section of the overdrive of FIG. 1.
Figure 3:
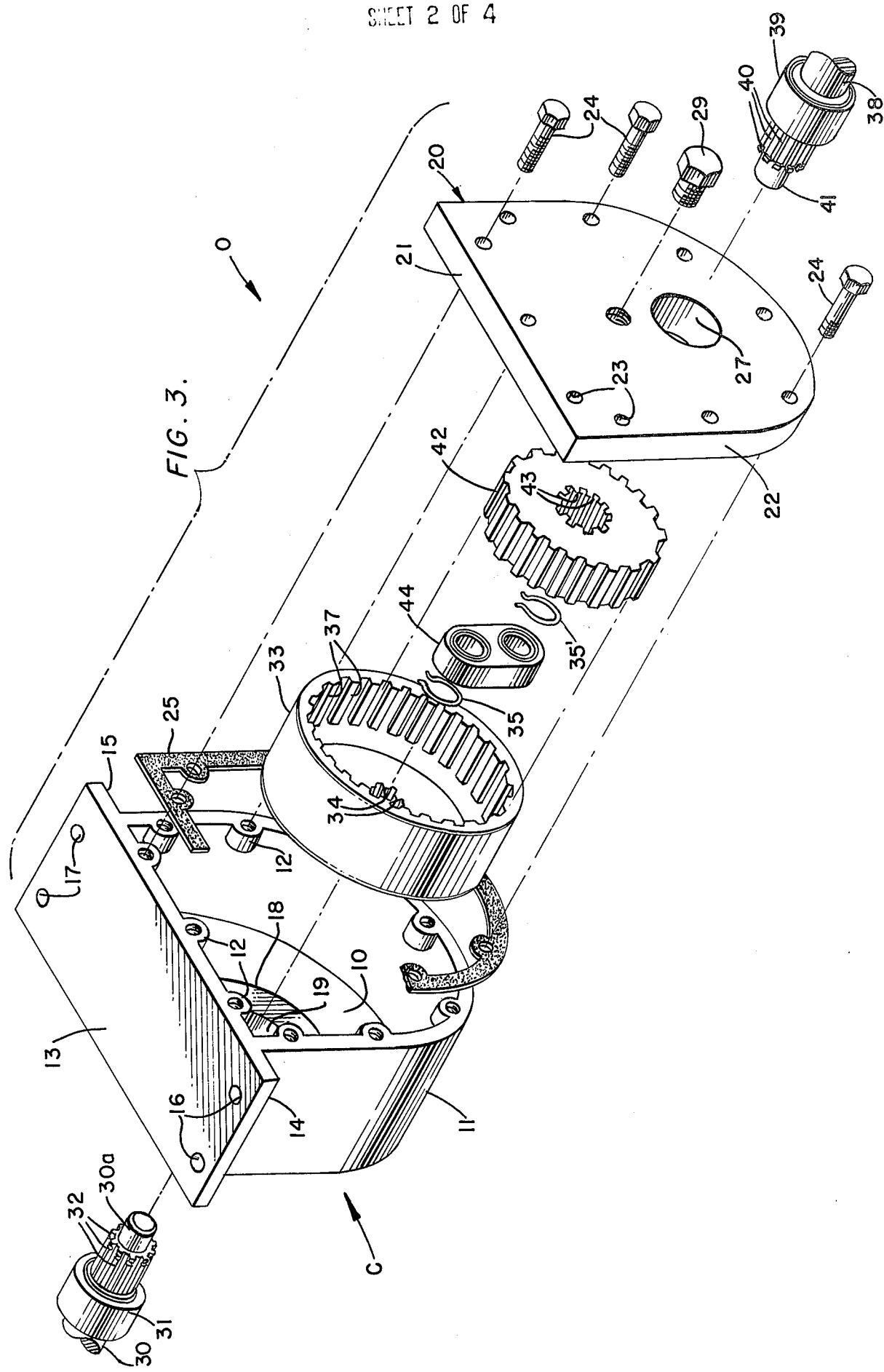
FIG. 3 is an enlarged, exploded perspective view of the overdrive of FIG. 1.
Figure 4:
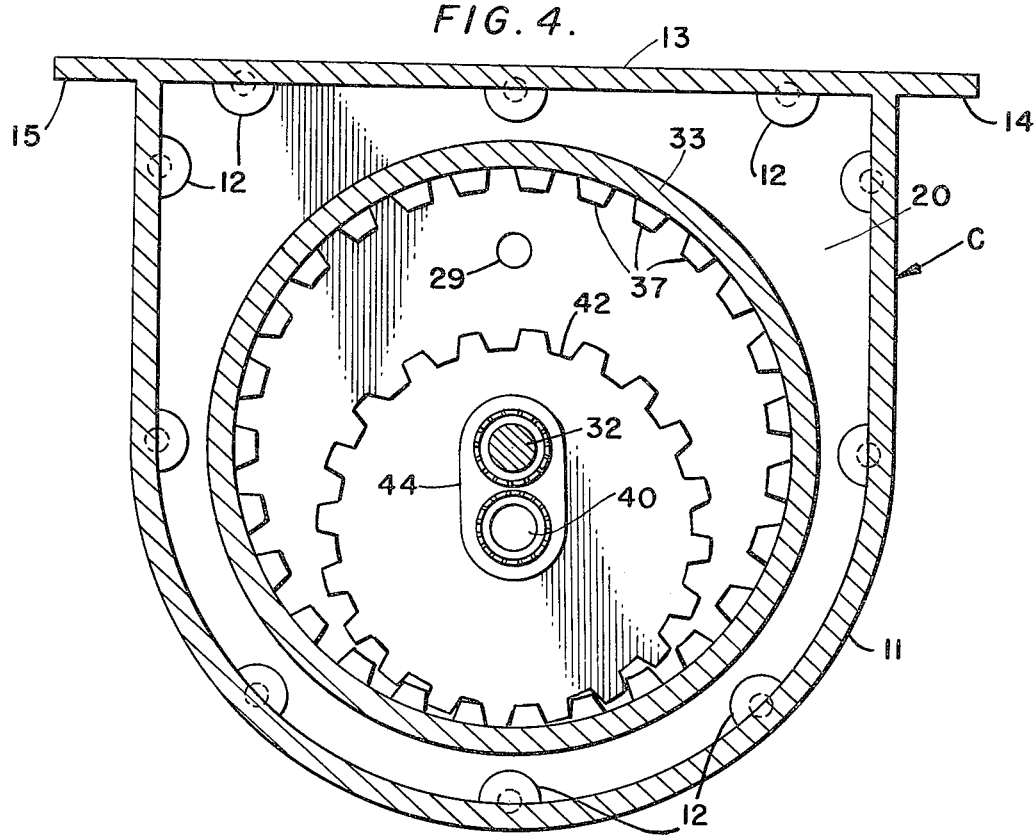
FIGS. 4 and 5 are views in section taken along lines 4—4 and 5—5, respectively, in FIG. 2.
Figure 5:
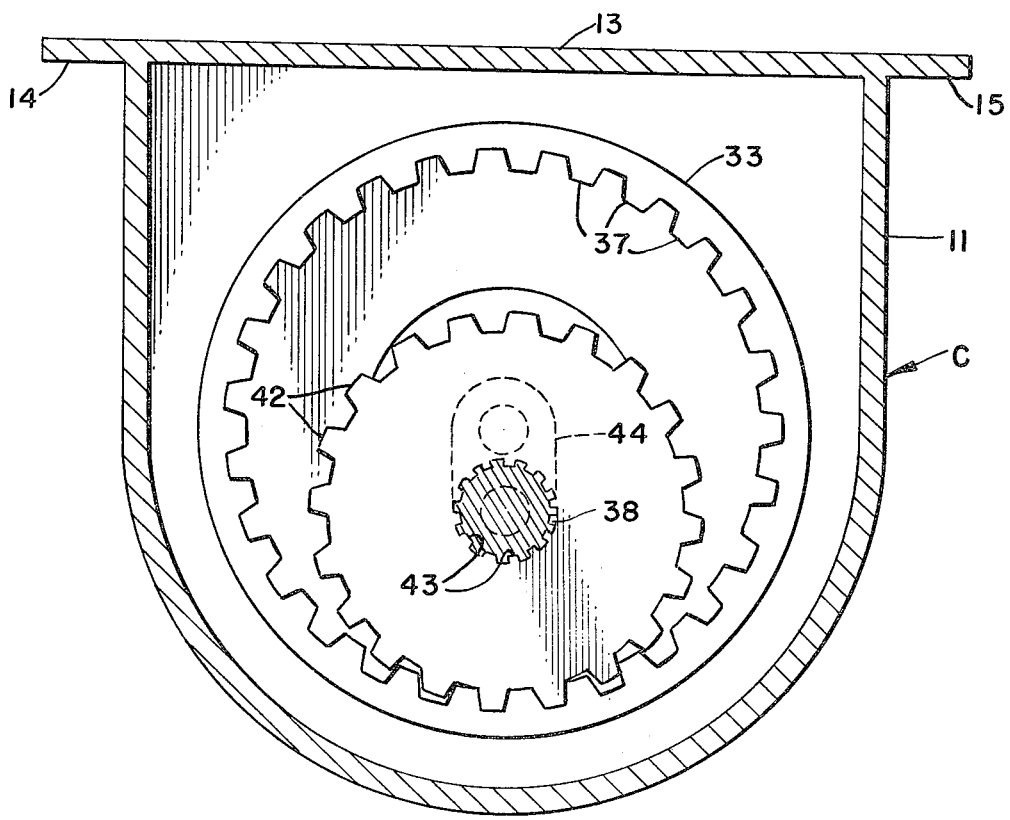

In the drawings, wherein like reference numerals indicate like parts throughout the several views, a first form of overdrive O is rigidly affixed to the frame or body F of the automobile in a position between an input propeller shaft P1 and an output propeller shaft P2 and between the transmission T and rear axle or differential A, whereby when the engine E is operated and the transmission T is placed in gear, the overdrive O is effective to turn the output propeller shaft P2 at a faster speed than the input propeller shaft P1, to thus obtain a higher gear ratio than the obtainable with the transmission T in any gear of the transmission.

The overdrive O includes a casing C made of a suitable material, such as steel or the like, and having an end wall 10 and a substantially semi-cylindrical curved or arcuately shaped side wall 11, with a plurality of internally threaded bosses 12 formed around the inner surface thereof, and a substantially flat top wall 13 with oppositely extending flanges 14 and 15 thereon, having openings 16 and 17 therethrough for reception of bolts or other suitable fastening means to secure the casing to the frame or body F of the automobile. An upstanding boss or shoulder 18 is formed on the end wall 10 and a central opening 19 extends therethrough. A closure plate 20, having a substantially straight upper edge 21 and an arcuate lower edge 22 and having a plurality of fastener receptive openings or holes 23 therethrough around the periphery thereof is suitably secured to the side wall 11 of casing C by means of a plurality of machine bolts or screws or the like 24 extended through the openings 23 in end plate 20 and into the threaded bosses 12 in the inner peripheral portion of the casing C. A suitable gasket 25 is clamped or sandwiched between the side wall 11 of casing C and the closure plate 20 to effect a seal that is fluid tight therebetween. An upstanding boss 26 is formed on the inside surface of closure plate 20 in offset relationship to the boss 18 on the end wall 10 of casing C and a central opening 27 extends through the closure plate 20 and boss 26, with the axis thereof parallel to but offset from the axis of opening 19 through end wall 10. A fill opening 28 is extended through the closure plate 20, and a threaded plug 29 is engaged in the fill opening 28 to close the opening.

A first or input shaft 30 is rotatably supported in the opening 19 by means of suitable bearings or the like 31 engaged between the shaft 30 and inner surface of opening 19, and the end of shaft 30 extends into the casing and has a plurality of axially extending splines 32 thereon and a reduced diameter end 30a. An internal gear 33 has a grooved or splined central opening 34 engaged on the splines 32 of shaft 30 and is fixed on the shaft 30 by means of a lock ring 35 inside the casing. The internal gear 33 has a cylindrical wall portion 36 with a plurality of gear teeth 37 formed on the inner surface thereof.

A second, output shaft 38 is rotatably supported in the opening 27 in closure plate 20 by means of a suitable bearing 39 disposed between the shaft 38 and inner surface of opening 27, and the shaft has a plurality of axially extending splines 40 thereon and reduced diameter end portion 41 disposed in substantial vertical alignment with reduced end portion 30a of shaft 30, but in offset parallel relationship thereto. A spur gear 42 has a splined central opening 43 engaged with the splines 40 on the shaft 38 and is also fixed to the shaft 38 inside the casing by means of a lock ring 35'. The spur gear 42 is arranged substantially in the same plane as the gear teeth 37 on the internal gear 33, and the spur gear 42 is maintained in mesh with the gears of the internal gear at all times.

A spacer block 44 has a pair of spaced apart openings 45 and 46 therethrough, and the reduced diameter end portions 30a and 41 of shafts 30 and 38, respectively, are journalled in the openings 45 and 46, and the spacer block 44 thus serves to securely maintain the shafts 30 and 38 in properly aligned, spaced apart relationship.

The shafts 30 and 38 have universal joints 47 and 48, respectively, at their outer ends operatively coupled with the adjacent ends of the input propeller shaft P1 and output propeller shaft P2.

A suitable lubricating fluid (not shown) is placed in the casing C through the fill opening 28 to lubricate the gears of the overdrive. The ratio of the gears 33 and 42 may be selected to have any desired value, depending upon the intended use thereof, or in other words, depending upon the type of vehicle in which the overdrive is to be used, and a typical overdrive of from between about 20 and 50 percent may be obtained with the present invention, without any significant deleterious effects on the operation of the automobile.

Figure 6:
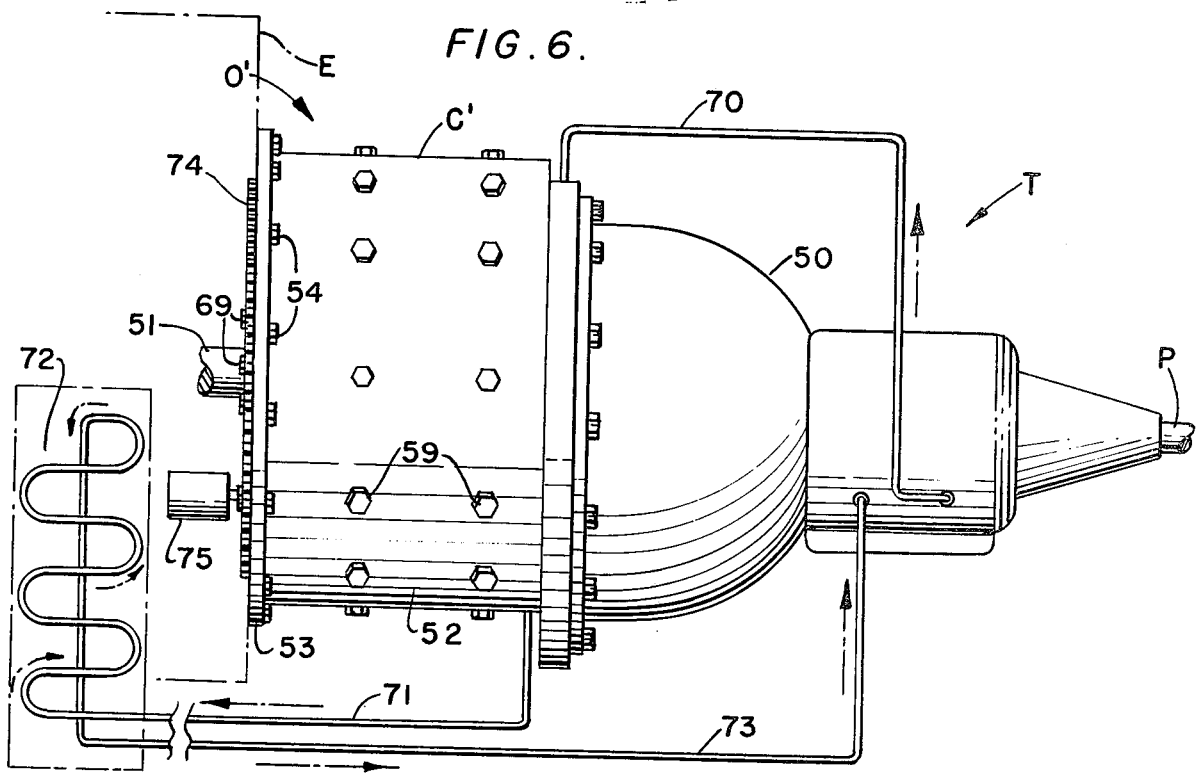
FIG. 6 is a view in elevation of the second form of overdrive according to the invention, shown in operative position relative to the transmission.
Figure 7:
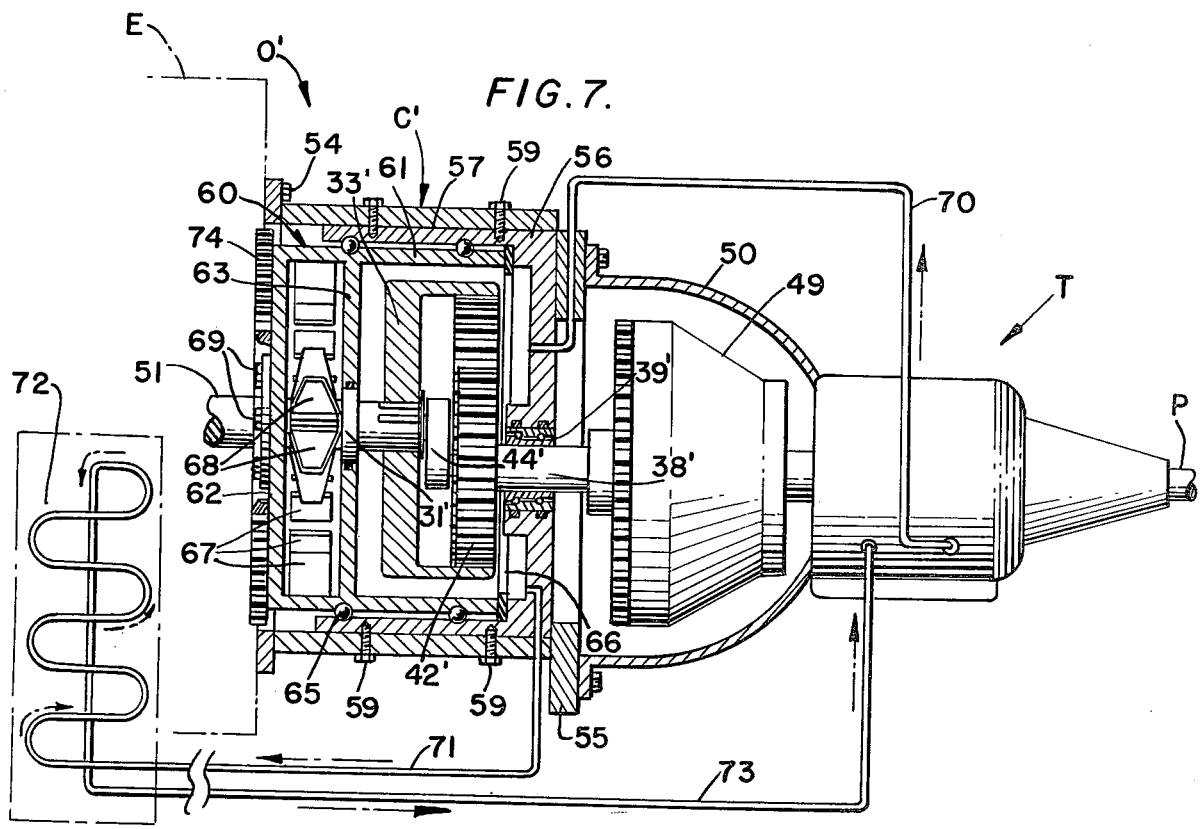
FIG. 7 is a view in section of the overdrive of FIG. 6.

A modified overdrive O' in accordance with the invention is illustrated in FIGS. 6 and 7, and in this form of the invention, the overdrive O' is mounted between the engine E and torque converter of the transmission T. As seen in FIG. 7, the torque converter 49 is housed within a bell housing 50, which normally is bolted to the rear of the engine E and the crank shaft 51 of the engine is bolted to the torque converter to drive the torque converter and transmission. However, in accordance with the invention, the modified overdrive O' includes a casing C' having a substantially cylindrical side wall 52 with a flange 53 on one end thereof, which is bolted to the engine E by means of a plurality of machine bolts or the like 54 and in the same position as the bell housing 50 would occupy if bolted directly to the engine. An adapter ring 55 is suitably secured as by bolts or welding or the like to the other end of the casing C', and the bell housing 50 is bolted to the adapter ring 55 and thus to the casing C' in a somewhat lower position than the torque converter would have if bolted directly to the engine. A substantially cup-shaped end closure housing or member 56 has a cylindrical wall 57 fitted within the cylindrical wall 52 of casing C' and an end wall 58 closing the end of the casing C'. A plurality of bolts or the like 59 extend through the cylindrical wall portions 52 and 57 to secure the wall portions together.

A fluid drive member 60 is rotatably supported within the cylindrical wall 57, and includes a cylindrical housing or side wall portion 61, an end wall 62, and a transverse intermediate wall 63, defining a closed fluid chamber 64 therebetween. The housing 61 is rotatably supported on bearings 65 and is sealed at its inner end against an annular seal means 66 disposed between the end of housing or side wall 61 and the end closure wall 58. The fluid drive 60 includes a plurality of vanes 67 fixed to the inner surface of the wall 61 in the chamber 64 and projecting radially inwardly therefrom, and a plurality of radially outwardly projecting vanes 68 fixed on the end of a shaft 30' journalled in bearings 31' in wall 63 of the fluid drive housing and projecting into the fluid chamber 64. An internal gear 33' is fixed as previously described to the shaft 30' outside of fluid chamber 64 and within the space surrounded by wall 61. A spur gear 42' is also secured as previously described to the end of a shaft 38', which is rotatably journalled in bearing means 39' in the end wall closure member 58, which extends through the wall and is connected to the torque converter 49. A spacer block 44' is connected with the adjacent ends of the shafts 30' and 38' to maintain them in a properly aligned relationship, and the crankshaft 51 of the engine is suitably secured to the housing of the fluid drive member 60 as by means of bolts or the like 69, whereby when the engine is operated, the crankshaft turns the outer housing member and vanes 67 of fluid drive 60 whereby a swirling motion is imparted to the fluid in chamber 64, which imparts rotation to the vanes 68 and thus to the shaft 30' and internal gear 33', which in turn imparts rotation to spur gear 42' and shaft 38' and thus through the torque converter and transmission to propeller shaft P and rear wheels W. The fluid within the fluid drive means 60 is sealed therein, but the transmission fluid is pumped through a conduit 70 and through a suitable fitting into the casing C' to lubricate the gears 33' and 42', and is withdrawn from the casing C' through a conduit 71 and thence into the transmission fluid cooling radiator 72, from where the transmission fluid returns through a conduit 73 to the transmission T.

A flywheel and a starter ring gear 74 are secured to the end wall of the housing of the fluid drive 60, and a starter motor 75 is positioned to be operatively engaged therewith, whereby the engine may be cranked by operation of the starter motor 75.

In this form of the invention, the fluid drive enables the overdrive to be easily used with automatic transmissions without having an deleterious effect on the operation of the automatic transmission or on the performance of the automobile, and the fluid drive may be selected from any one of several well known and conventional fluid drive mechanisms.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative

I claim:

1. An automobile overdrive for an automobile having an engine, a transmission and a rear axle, said overdrive comprising a casing fixedly connected to the automobile between the transmission and rear axle, said casing having opposite end walls and an opening through each end wall, an internal gear rotatably supported in the casing, a first shaft connected with the internal gear and extended outwardly through the opening in one end wall of the casing and journalled in a bearing means in said opening and connected to the transmission to be driven thereby, a spur gear rotatably supported in the casing in mesh with the internal gear, a second shaft connected with the spur gear and extended outwardly through the opening in the other end wall of the casing in offset parallel relationship to said first shaft and journalled in bearing means in said opening, a spacer block connected with adjacent ends of said first and second shafts inside said casing to maintain said shafts in spaced apart, parallel relationship, and said second shaft connected with the rear axle so that a higher gear ratio is obtained at all times than can be obtained with only the transmission, to thus increase the economy of operation and to reduce both wear on the engine and the amount of pollutants discharged to atmosphere by the engine.

2. An automobile overdrive as in claim 1, wherein the casing includes a side wall and a substantially flat top wall, said top wall having means thereon for attachment of the casing to the automobile, said other end wall comprising a cover plate secured to the side wall opposite said one end wall, and universal joint means on the outer ends of said first and second shafts for connection of said shafts to the transmission and rear axle, respectively.

3. An automobile overdrive for an automobile having an engine, a transmission and a rear axle, said overdrive comprising a casing having opposite ends and fixed at one end thereof to the rear of the engine, said transmission connected to the other end of the casing, a fluid drive means supported in the casing, means connecting the fluid drive means to the crankshaft of the engine to be driven thereby, an input overdrive gear connected to the fluid drive means to be driven thereby, an output overdrive gear in mesh with the input overdrive gear, and means connecting the output overdrive gear to the transmission to thus obtain at all times a gear ratio higher than that obtained with the transmission.

4. An automobile overdrive as in claim 3, wherein said casing has a cylindrical side wall with a flange on one end thereof, fastening means extended through said flange into the engine mounting said casing to the engine, an adapter secured to said other end of said casing, said transmission secured to said adapter, a substantially cup-shaped end closure secured within said other end of said cylindrical side wall and closing said other end of said casing, said fluid drive means comprising a substantially cylindrical housing having a closed fluid chamber thereon and an axially extending cylindrical wall portion thereof rotatably supported in said casing, a shaft journalled in an end wall of said fluid chamber and extending at one end thereof into the chamber, vane means on said shaft in said closed fluid chamber, cooperating vane means fixed to said housing in said chamber for imparting a swirling motion to fluid in said chamber to impart rotation to said shaft, said input overdrive gear including an internal gear fixed to said shaft in said casing, whereby rotation of said shaft causes rotation of said internal gear, said output overdrive gear comprising a spur gear meshed with the internal gear and mounted on a shaft extended through said end closure and connected with the torque converter of the automobile transmission, so that the overdrive is operated through a fluid drive connection, permitting its use at all times with both automatic and manual transmissions.

5. An automobile overdrive as in claim 4, wherein a flywheel and starter ring gear are secured on said fluid drive housing, whereby energization of the automobile starter motor cranks the engine.

6. An automobile overdrive as in claim 5, wherein a first conduit extends from the transmission to the overdrive for conducting transmission fluid from the transmission to the overdrive, a second conduit extends from the overdrive to a transmission fluid cooling radiator, and a third conduit extends from the radiator to the transmission for effecting circulation of transmission fluid through the transmission and through the overdrive and cooling radiator.

* * * * *